Dec. 1, 1931. C. E. CARPENTER 1,833,933
DOUGHNUT MACHINE AND THE LIKE
Original Filed Feb. 29, 1928  2 Sheets-Sheet 2
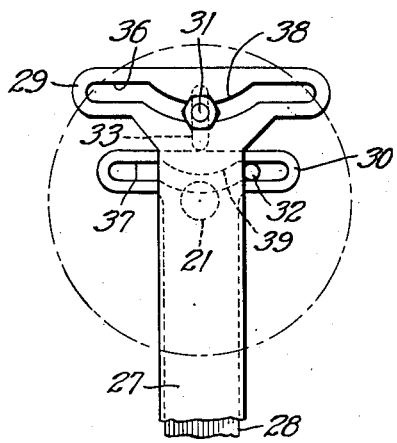
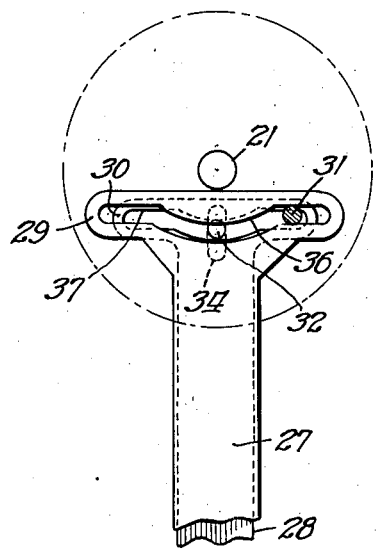
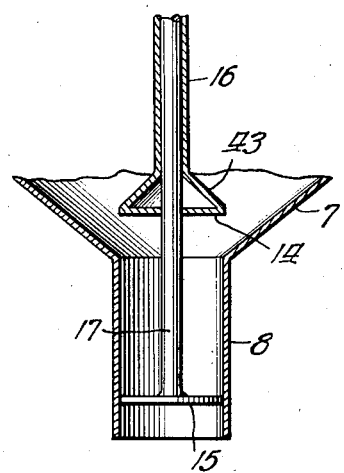
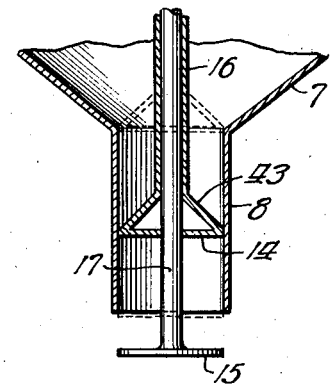
Inventor
Charles E. Carpenter Patented Dec. 1, 1931

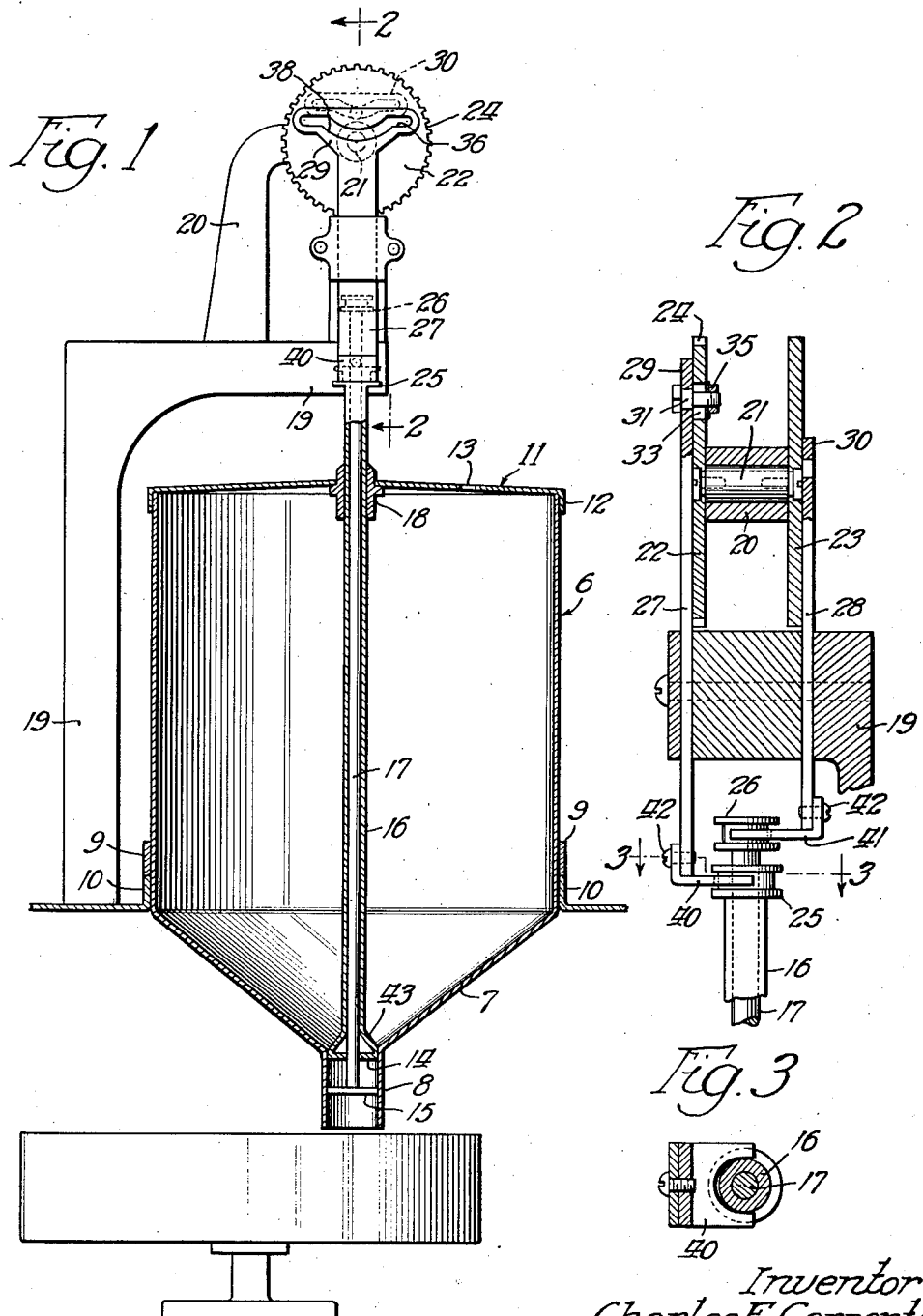

1,833,933

UNITED STATES PATENT OFFICE

CHARLES E. CARPENTER, OF CHICAGO, ILLINOIS

DOUGHNUT MACHINE AND THE LIKE

Original application filed February 29, 1928, Serial No. 258,014. Divided and this application filed January 21, 1929. Serial No. 333,942.

The present invention has to do with improvements in machines for feeding batches of dough and the like. The machine is particularly intended for the feeding of batches of dough for the frying of doughnuts and for similar operations. In this connection I will state that the doughnut dough used in the making of doughnuts is of rather thick consistency and will not flow readily. In these respects as well as others this material differs very markedly from such materials as waffle dough, so called pie-filler, and materials of that kind.

The present invention relates to the construction and operation of dough batch mechanisms irrespective of the details of construction of the frying pan and other related parts.

One object of the invention is to provide a dough-feeding mechanism comprising a pair of cooperating plungers or elements working in proper timed relationship with respect to the throat through which the dough material is delivered into the pan. These two plungers or parts are reciprocated in such timing that the dough batch is isolated or segregated into the delivery throat extending down from the hopper, and thereafter the dough batch is forced down and is delivered from the lower end of the throat, the lower valve member or plunger having been lowered sufficiently to permit this operation to take place, and thereafter the lower plunger is raised up towards and into the lower end of the throat so as to cut off and perforate the dough batch, the upper plunger remaining stationary during this movement so as to prevent reentrance of the dough material upward through the throat into the hopper; and thereafter both of the plungers are raised in harmony and finally the upper plunger moves to its maximum elevation so as to draw a fresh batch of dough in under it and have thus prepared the parts for another operation.

Another feature of the invention relates to the provision of an improved operating means for bringing about the foregoing movements in proper timed relationship. In this connection it is a further object to make provision for readily disconnecting the plungers from the operating mechanism when the plungers are to be entirely removed from the hopper.

Another feature of the invention relates to the provision of an upper plunger which has a conical or tapered top surface. By this arrangement the upper plunger will move readily up into the body of the dough contained within the hopper and with a greatly reduced tendency to lift the entire mass of dough away from the throat. This tapered form of top surface of the upper plunger will therefore materially facilitate the plunger movements in the body of the dough and insure a more uniform and regular operation of the feeding of the doughnuts.

Other objects and uses of the invention will appear from a detailed description of the same which consists in the features of construction and combination of parts hereinafter described and claimed.

In the drawings:

Figure 1 shows a vertical longitudinal section through a machine embodying the features of the present invention, the delivery throat being shown as located directly above the frying pan into which the dough batches are delivered; and the two plungers are shown in a raised position;

Fig. 2 shows a fragmentary section on the line 2—2 of Fig. 1 looking in the direction of the arrows and on enlarged scale;

Fig. 3 shows a horizontal section on the line 3—3 of Fig. 2 looking in the direction of the arrows;

Fig. 4 shows a detail view partly in section illustrating the two plungers in one position where the upper plunger is at its highest point and the lower plunger is moving downwards; and Fig. 5 shows a view similar to that of Fig. 4 but with the lower plunger at its lowest position and with the upper plunger approaching to its lowest position.

This application is a division of my copending application for patent on doughnut machines and the like, Serial No. 258,014, filed February 29, 1928.

The hopper is designated generally by the numeral 6. It has a downwardly tapered or drawn floor 7 which terminates in a central downwardly extending throat 8. The hopper is supported in any convenient manner as for example by the engagement of a band or ring 9 which is secured to the hopper and rests upon a supporting flange or the like 10. By this arrangement the hopper can be readily lifted away by the supporting flange when the hopper is to be cleaned or replaced.

A cover 11 is provided for enclosing the upper end of the hopper. Said cover is made removable and has a flange 12 which is adapted to seat down around the upper edge of the hopper proper. Preferably a vent hole 13 is provided in the cover.

There are the upper and lower plungers 14 and 15 which are vertically reciprocable with respect to the throat 8. The plunger 14 is carried by a hollow stem 16 and the plunger 15 is carried by a central stem 17 which reciprocates up and down within the hollow stem 16. Preferably a thimble 18 is placed in the cover 11 at the point where the hollow stem 16 works up and down through said cover. This thimble therefore serves as a guide for the stems in their vertical movements.

The plungers 14 and 15 are of such size that they are both able to work through the throat 8. Furthermore their reciprocations are so related that normally one or both of them is always engaged within the throat thus affording a lower guide for the vertical reciprocation of the plungers.

Means are provided for reciprocating the two plungers in timed relationship and in harmony. The relative movements of the two plungers are important since the satisfactory delivery of the dough batch depends to a considerable degree on these movements. It will be noted that in Fig. 1 the lower plunger 15 stands about one half way up in the throat 8. This is approximately the highest point to which said plunger need rise, although the parts may be so designed that it will rise somewhat higher. It will also be noted that in Fig. 1 the upper plunger 14 is just at the upper end of the throat.

From the position in Fig. 1 the upper plunger 14 should be raised well above the upper end of the throat and into the hopper while holding the lower plunger 15 approximately stationary. By this relative movement the separation between the plungers is increased, a suction action is exerted between them, and a fresh batch of dough is drawn in beneath the upper plunger 14.

About the time that the upper plunger reaches its upper limit or slightly before or after such time, the lower plunger starts to move downwardly and then it is accompanied in such movement by the upper plunger. The result is that very shortly thereafter the upper plunger reenters the upper end of the throat 8, the lower plunger having travelled down through said throat, and thus the entire dough batch is trapped in the throat between the two plungers.

The downward movement of the two plungers continues more or less in harmony until the lower plunger passes out from the lower end of the throat, fully uncovering the same as shown in Fig. 5. About this time the downward movement of the lower plunger ceases, the downward movement of the upper plunger continuing so that the space between the two plungers closes up and the dough batch is forced out of the lower end of the throat and around the lower plunger which is being suspended beneath the throat.

Thereafter the lower plunger again starts to move upwards while the upper plunger is retained practically stationary at its lowermost position. The result is that the dough batch is prevented from returning upwards due to the stationary condition of the upper plunger 14 until such time as the lower plunger has risen far enough to reenter the lower end of the throat 8. At this time the dough batch is cut off by engagement of the lower plunger with the lower edge of the throat, and also the dough batch is perforated by the lower plunger. As a result the completed doughnut form drops away and is delivered into the frying pan. The particular means for operating the hollow and central stems will now be described in detail.

There is a stationary bracket 19 reaching up from which is an arm 20. The arm 20 carries a stub shaft 21 which is journaled therein, and the disks 22 and 23 are fastened on the ends of the stub shaft and rotate therewith in harmony. Either one of these disks may be provided with peripheral teeth 24 so as to establish a gear by means of which it may be conveniently driven.

The upper ends of the hollow and central sleeves carry the grooved collars 25 and 26 respectively. There are slide plates 27 and 28 slidably mounted in the bracket 19 and guided thereby in their vertical reciprocations. The upper ends of these slide plates 27 and 28 carry the cross heads 29 and 30 which lie close to the faces of the respective disks 22 and 23. These cross heads are transversely slotted as best shown in Figs. 1, 4 and 5, and driving studs 31 and 32 are carried by the disks 22 and 23 respectively and engage with the slots of the cross heads. By this arrangement the rotations of the disks will be converted into vertical reciprocation of the slide plates 27 and 28. The studs 31 and 32 are preferably extended through radial slots 33 and 34 in the respective disks so that the studs can be set at greater and smaller radii as desired and may be secured at such positions by means of the nuts 35 (see Fig. 2). The studs are preferably shouldered as shown in Fig. 2 so that when the nuts 35 are tightened up the studs will be locked in proper adjustment but without clamping the cross heads against the disks.

The slots on the cross heads should be of proper shape and size to give the desired relative movements for the two plungers 14 and 15. Generally speaking the cross heads 29 and 30 are provided with the transverse stud slots 36 and 37 respectively; and the central portions of these slots are formed on curves 38 and 39 which curves are approximate circular arcs for the average radius at which the corresponding stud is set. Furthermore, these curves face upwardly and therefore constitute dwells for the lower limits of movement of the plungers.

The proper timing of the reciprocations of the two plungers is secured by timing the positions of the two studs in an angular or rotational direction. Examination of Figs. 4 and 5 will show that these studs are located at approximately 90 degrees from each other so that they quarter as the disks are rotated. This will give the desired timing to the plungers.

The connections between the slides 27 and 28 and the grooved collars 25 and 26 are made by means of bifurated finger pieces 40 and 41. These finger pieces are connected to the lower ends of the slides 27 and 28 as by the screws 42 so that the finger pieces can be readily removed to allow the stems 16 and 17 to be disengaged.

Examination of the different figures will show that the top surface 43 of the upper plunger 14 is conical or tapered in form. The result is that on the upward movements of the upper plunger said plunger is enabled to readily move into and penetrate the dough within the hopper, said dough sliding down around the upper plunger in order to occupy the space vacated beneath said plunger.

While I have herein shown and described only a single embodiment of the features of my present invention still I do not intend to limit myself thereto except as I may do so in the claim.

I claim:

A dough batch machine including in combination a hopper having a downwardly depending throat, a disk valve and a plunger working in said throat, the plunger being above said disk valve, operating connections extending from the disk valve and the plunger upwardly through the hopper, a pair of vertical disks above the hopper and in alignment therewith, sidewise projecting pins on said disks, means for adjusting the radius of rotation of said pins, and cam connections between said pins and the upwardly extending operating connections aforesaid, substantially as described.

CHARLES E. CARPENTER.